March 17, 1970 J. O. KELLEY 3,501,103

REVERSE DRIVE PINCH ROLLER FOR SOUND TAPE

Filed Nov. 14, 1966 4 Sheets-Sheet 1

INVENTOR.
Jerry O. Kelley
BY
ATTORNEY.

REVERSE DRIVE PINCH ROLLER FOR SOUND TAPE

Filed Nov. 14, 1966 4 Sheets-Sheet 2

INVENTOR.
Jerry O. Kelley
BY
ATTORNEY.

INVENTOR.
Jerry O. Kelley
BY
[signature]
ATTORNEY.

March 17, 1970 J. O. KELLEY 3,501,103

REVERSE DRIVE PINCH ROLLER FOR SOUND TAPE

Filed Nov. 14, 1966 4 Sheets-Sheet 4

INVENTOR.
Jerry O. Kelley
BY [signature]
ATTORNEY.

United States Patent Office 3,501,103
Patented Mar. 17, 1970

3,501,103
REVERSE DRIVE PINCH ROLLER FOR SOUND TAPE

Jerry O. Kelley, Chicago, Ill., assignor to Cart-Trac, Inc., Chicago, Ill., a corporation of Illinois
Filed Nov. 14, 1966, Ser. No. 593,775
Int. Cl. G11b *15/32;* B65h *17/23*
U.S. Cl. 242—188 14 Claims

ABSTRACT OF THE DISCLOSURE

The disclosure relates to reel-to-reel sound tape apparatus, especially of the cartridge adapted for use with a capstan spindle driven by a reversing motor wherein a composite pinch roller and pulley system has a reel pulley coaxially rotatable with the roller at each axial end thereof, and the pulleys have hubs cooperating with part of the confronting pinch roller hub with complex clutch means between the confronting hub elements and sensitive to both direction of drive and position of the cartridge to drive a particular reel in a particular direction responsive either to reversal of the motor or turning the cartridge over from one side to the other.

This invention relates to sound tape cartridges of the reel-to-reel type with a pinch roller disposed within the cartridge and provides improvements in a reverse-driving type of pinch roller such as disclosed in U.S. application Ser. No. 354,477, now Patent No. 3,348,786, characterized particularly in that the disclosed pinch roller structure not only includes as a part thereof a reverse-drive clutch mechanism, but reel-driving pulleys each including individual slip-clutch means forming part thereof and operable in either direction with the result that each tape reel can be driven directly through a pulley belt from the pinch roller assembly without slip clutch means at, or forming part of the reel assembly.

Thus, it is an object of the invention to provide a composite pinch roller with included reverse-drive clutch means and tension-controlling reel-driving pulley means wherein each of a pair of reel-driving pulleys is mounted coaxially with the pinch roller at one end thereof to be reversely driven thereby positively in one direction only, which is opposite from the driving direction of the other, by reverse-acting clutch means which is contained partly or wholly within the pinch roller itself as a part thereof; and Wherein each reel pulley is positively driven in either direction by the pinch roller through an impositive slippage coupling therewith, with the slippage coupling means contained within the pulley body; and Wherein the pinch roller has a hub structure constituting a substantial part of the reverse-clutching mechanism and taking the form of coaxially-disposed internally-contained helical clutch springs, as well as the form of ball and gravity sensitive clutch means disposed at and cooperable with hub portions of the pinch roller at the opposite axial ends thereof; and Wherein internal portions of the reel-drive pulleys also include parts of the reverse-drive clutch means as well as their appertaining slip clutch means;

Wherein the composite reverse-drive pinch roller structure is provided in a form capable of reverse-reel-driving rotation responsive alone to reversal of the capstan spindle which drives it; or responsive only to flip-flop (turnover) of the cartridge; or responsive to both capstan reversal and flip-flop;

A still further feature of the disclosed improvements relates to the provision of a simple and economical reversing control means on the tape web for effecting reversal of capstan rotation in connection with those forms of the pinch roller drive means responsive to this type of reversal, as well as the form adapted to both capstan reversal and flip-flop operation.

The foregoing and further objects and aspects of novelty and utility characterizing the invention will be more fully explained in the following description taken in view of the annexed drawings in which.

Figures 1, 2:
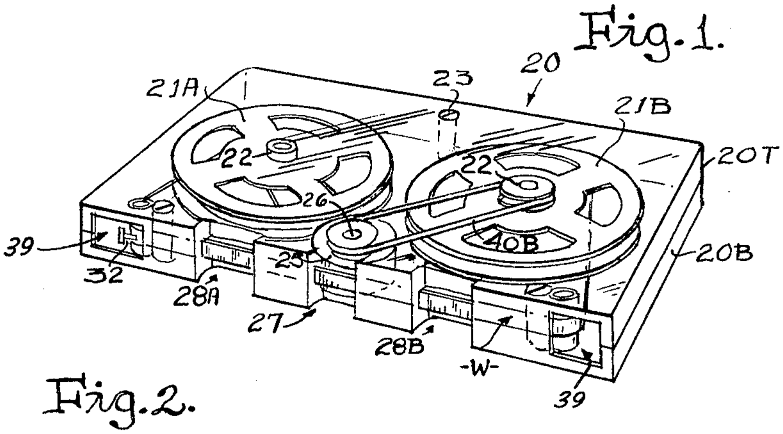
FIGURE 1 is a perspective view of a reel-to-reel tape cartridge embodying the improved pinch-roller means.
FIGURE 2 is a top plan view of the cartridge positioned on a sound deck shown fragmentally.

Although equally advantageous when used on a sound deck, the disclosed pinch roller structures are especially intended for use in compact reel-to-reel cartridges 20 such as depicted in FIGURE 1, wherein two tape reels 21A, 21B are rotatable on Spindles 22, which will preferably be integrally formed with the bottom section 20B of the cartridge case, to be retained thereon by the top section 20T held by means such as screws 23.

The tape web W travels in alternation from one reel to the other, depending upon the direction of rotation of a pinch roller 25 also freely rotatable on an integral spindle 26 within the cartridge and having portions of its periphery exposed through a central window 27 on the side thereof, which contains a trackway in which the tape web moves past the sound-head windows 28A, 28B, the tape also passing over the periphery of the pinch roller wherein it is exposed to engagement by a motor-driven spindle or capstan 29, as in FIGURE 2, whereby the tape and roller are displaced in one or the other direction, depending upon the direction of rotation of the capstan.

As viewed in FIGURE 2, the portions of the tape web W exposed at windows 28A, 28B will engage sound heads 30A, 30B, one of which will be connected in a transducing circuit (not shown) corresponding to one particular direction of travel of the tape to reproduce one of several sound tracks in the known manner. When the web of tape nears the end in either direction, it becomes necessary to stop or reverse the capstan driving motor 31, and to this end a special means on the tape is provided, as depicted in FIGURE 3, in the form of a tripping tab 32 of T-shaped configuration, the end 33 of the stem of which is affixed, as by heat-seal or adhesive, to the tape web W near its end attachment to the hub 20X of the appertaining reel, there being one of these trip tabs near each end of the tape, the T-cross bars on the stems thereof each being disposed nearest the corresponding reel and attached end of the tape so as to control both directions of travel.

Figures 3, 3A, 4:
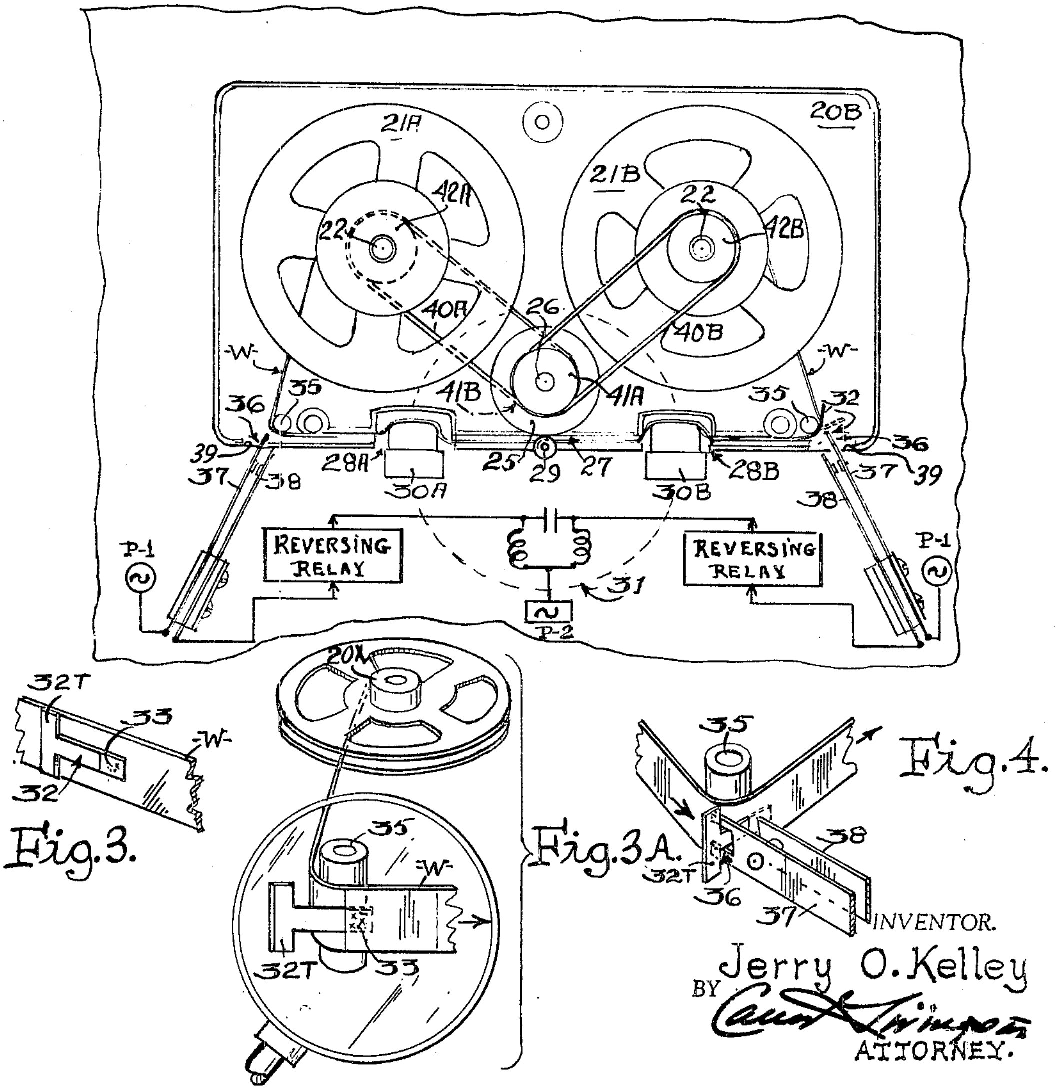
FIGURES 3 and 3A are perspective details showing parts of the capstan drive reversing control means magnified.
FIGURE 4 is another enlarged perspective fragment of the capstan reversing control means.

As illustrated in both FIGURES 2 and 3A, the tape web passes over rounded posts 35 or the like at each end of the trackway and around which the tape must turn, as in FIGURES 3A and 4, on entering the trackway.

The tripping tabs 32 are made of a material preferably also a plastic, which is relatively stiffer than the usual plastic sound tape, and because of this, and the fact that only the foot region of the T-stem is firmly attached to the tape web, and then in a small area thereof at said end, the tab on passing over the post 35 will cause the unattached portions of the T-tab to project in a tangential sense to the post on making a turn thereon of approximately 90°, which brings the plane of the T-tab into approximate parallelism with the plane of the tape on the straight-away after making said turn, in consequence of which the T-crossbar 32–T stands out in space at the trailing side of the post with respect to the direction of travel of the tape at this time.

In the spatially-projected condition aforesaid the T-head or crossbar is turned into position to become trapped or caught in the forked jaws or tangs 36 of a switch control element 37, which in the embodiment shown is a spring switch contact blade, with a resultant actuation of the switch means, for example, by springing the switch blade 37 into contact with a companion blade 38 to actuate a control means such as a Relay Means or the like to stop or reverse the capstan motor 31 in the known manner, there being duplicate control devices or switches 37, 38 at each end of the cartridge (FIGURE 2) with their respective tab engaging parts 36 projecting slightly into corresponding endwise control windows or openings 39 adjacent the aforesaid turning posts 35 for dual control, whether stoppage or reversal.

The reverse travel of the tape requires that the reel which is winding in the tape, usually referred to as the take-up reel, must be positively driven at a rate commensurate with the speed of the pinch roller, while the reel from which the tape is unwinding, called the pay-out reel, should run as freely as possible without danger of spin-out or overrun which would cause the tape to spill, bunch or jam in moving toward the pinch roller or sound head.

The automatically reversing clutch means which is built into and forms a part of the pinch roller is effective to reverse the tape immediately upon signal, but the angular movements of the two reels involve constantly varying motion and force factors due to the changing ratios of the diameter of the core of tape on the pay-out reel as compared with that on the take-up reel, the latter increasing while the former decreases with correspondingly progressive changes in the pull on the tape web, as well as the tendency of the tape to pack unevenly, etc., all of which can markedly affect the quality of the resulting sound reproduction, it being necessary that the speed of the tape in passing over the sound heads be as nearly constant as possible; with, of course, the further requisite that the spooling of the tape shall be trouble-free and of a character to eliminate forces tending to cause tape breakage and excessive wear.

Prior capstan-driven feed tapes of the reel-to-reel type have attempted a variety of arrangements for governing the rotation of the reels in their respective take-up and pay-out functions, including the provision of various kinds of automatic brake, friction devices and differential driving arrangements which have sought to restrain the pay-out reel from overrunning so as to keep a tension on the outgoing web while the pull on the take-up reel is kept positive without being absolutely constant. All such arrangments have required the provision of slippage means at both reels, with and without additional tensioning and braking means to prevent overrunning.

In U.S. Patent No. 3,348,786, previously mentioned, a cartridge is disclosed employing a pinch roller with included reverse clutching means and a reverse-acting automatic tensioning brake automatically applying a drag always to the pulley belt of the reel which serves at any given time as the pay-out reel, both reels being provided with slip-clutch means for automatic adjustment of differential pulling in rotation.

In accordance with the present disclosures, all clutching and slippage devices can be eliminated at the reels, and the drive pulleys which are made part of the pinch roller combination are contrived to effect automatic adjustments in coaction with the pinch roller, thereby simplifying the cartridge structure in respect to the spindle means required for the reels, and the reels themselves, while improving the performance with the control centered in the pinch roller as a complete unitary reverse-drive intrumentality.

Referring to FIGURES 1 and 2, it will be observed that two pulley belts 40A, 40B start the pinch roller, one being driven from an upper drive pulley 41A on top thereof and the other belt being driven by a lower pulley 41B underneath the pinch roller. Both reels are provided with driven pulleys 42A on the underside of reels 21A and 42B on top of reel 21B, both pulleys being preferably molded as an integral part of their respective reels, since no slip clutch of brake means or like additional parts are required at the reels according to the invention, it being evident that this type of pinch roller construction makes it possible to employ one inexpensive and simple type of reel at both positions in the cartridge.

Figure 5:
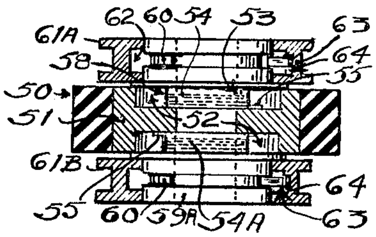
FIGURE 5 is a vertical section through a first form of the composite pinch roller clutch and pulley-drive and coupling means.
Figure 6:
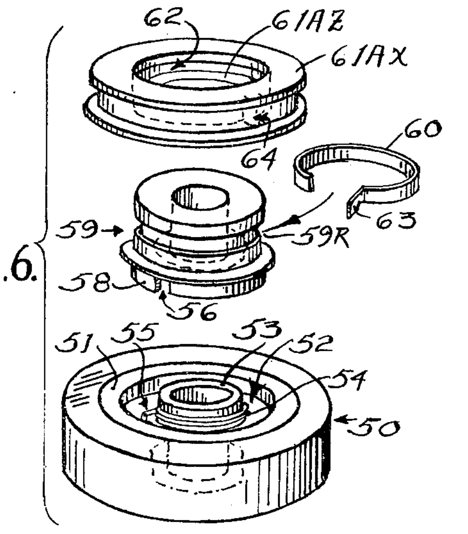
FIGURE 6 is an exploded perspective view of parts of the device seen in FIGURE 5, but to somewhat enlarged scale.

The form of the pinch roller drive depicted in FIGURE 5 comprises the pinch roller annulus 50, itself, usually made of a moderately firm rubber composition and fitted onto a central hub structure 51 which may be molded or machined from brass with an annular cavity or well 52 at each axial end thereof surrounding an axially extending sleeve or collar portion 53 (FIGURE 6) on which is fitted a helical clutch spring 54, one offset end 55 of which will be anchored in a slot 56 formed in the skirt 58 of a pulley hub 59, (FIGURE 6) said skirt having a diameter to fit freely into said annular well for rotation therein, this construction being repeated identically for the clutch spring 54A and pulley hub 59A at the opposite axial end of the pinch roller so that only the upper part of the assembly is described in view of FIGURE 6.

The operation of the last-described clutch means is such that when the pinch roller is driven in one direction, as by a capstan 29 such as seen in FIGURE 2, the clutch spring at one or the other but not both ends of the roller will wind itself tighter on the collar 53 effectively grabbing and turning with the latter to impart the like motion to the pulley hub; and when the direction of rotation of the pinch roller is reversed, the same clutching action will occur at the opposite spring 54A while the first-mentioned clutch spring 54 slips freely about its sleeve post or collar 53.

As in FIGURE 5, there are provided at each axial end of the pinch roller upper and lower drive pulleys 61A, 61B, the same being of identical construction and operation, as will appear in view of FIGURE 6 wherein the pulley sheave 61AX is seen to be of annular shape with a large central bore 61AZ adapted to fit over the upper end of the corresponding pulley hub structure 59 in which there is formed an annular groove or spring race 59R adapted to seat a substantially circular clutch spring 60 having an offset end 63.

The sheave bore 61AZ has an internal spring race 62 disposed to align with the hub race 59R in assembled condition to accommodate intermediate portions of the arc of the circular spring 60 which will engage frictionally therein owing to the expansive bias provided in this spring. The offset end 63 of the pulley spring fits into a notch 64 formed in the sheave race so that the spring is carried with the pulley sheave in rotation of the latter, and the tendency of the sheave is to force the circular spring against the pulley hub 59 and particularly the raceway portions 59R therein so that as the hub is rotated through the main helical clutch spring 54 in the pinch roller the pulley hub transmits a like rotative effort or torque to the pulley sheave through the said circular spring which, however, will yield in either direction and permit the pulley to slip if more than a desired degree of resistance is exerted on the appertaining tape reel driven therefrom by a pulley belt such as the belt 40B of FIGURE 1, for example. The construction and operation of the bottom pulley assembly and associated clutch and coupling spring means is identical to that described for the upper counterparts.

Figure 7:
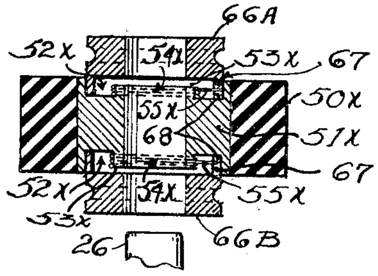
FIGURE 7 is a cross-section of a modified form of the type of device shown in FIGURE 5.
Figure 8:
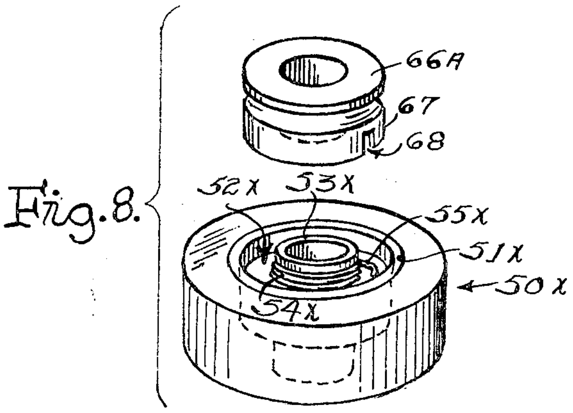
FIGURE 8 is an exploded partial perspective of parts of the form of device seen in FIGURE 7.

According to a further modified construction of this type of pinch roller shown in FIGURES 7 and 8, a helical spring clutch means is employed which is identical in principle, construction and operation to that described in view of FIGURE 5, with the exception that the drive pulley means employs a different coupling or slip-clutch means. Like the previously-described constructions, this form of pinch roller also employs an annular rubber or like roller 50X fitted upon a brass or like hub 51X likewise having cavities 52X at its axial ends in each of which is an axially-extending collar 53X fitted with a corresponding helical clutch spring 54X having an offset free end 55X engageable with a corresponding upper pulley member 66A (or lower pulley 66B) formed in one piece, preferably of brass if the roller hub is brass, said pulley having an annular skirt 67 fitting closely but rotatively into the end well of the appertaining end of the roller hub, the end 55X of the corresponding helical clutch spring fitting into a notch 68 in said skirt (FIGURE 8 also) whereby to turn the appertaining pulley with the pinch roller in only one direction of rotation of the latter.

Since the helical spring clutch means is effective to cause positive driving rotation of only one of the drive pulleys at a time, depending upon the direction of rotation of the roller as previously explained, one of the pulleys will always run "free"; however, by reason of the fact that the entire assembly turns on one spindle 26, and the free pulley tends to turn with its corresponding belt and reel in pay-out action, and the "free" belt (preferably a rubber-like O-ring) exerts a tension on the pulley which is transmitted as friction on the spindle which provides drag reflected back to the idling pay-out reel, the end result during rotation of the pinch roller is the application of a yieldable braking effect on the free-running pulley and its pay-out reel to the same purposes as the braking effect imparted by the slip spring means 60 in the embodiment of FIGURE 5. By seating the lower rim of each brass pulley 66A, 66B on the brass roller hub, additional braking friction can be had. While the construction of FIGURE 7 is simpler than that of FIGURE 5, the latter has the advantage of affording a selection of slipping responses by use of different slip springs 60 of appropriate tension.

Figure 9:
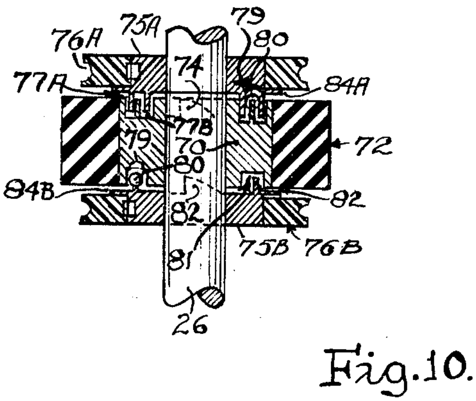
FIGURE 9 is a vertical section through a modification of the structures of FIGURES 5 and 7.

Another compact form of the combination pinch roller, reverse clutch mechanism and pulley-coupling means is shown in FIGURE 9, wherein the pulley structure embodies some of the clutching mechanism in axial juxtaposition with complementary clutch means at the appertaining axial ends of the pinch roller hub structure.

Figure 10:
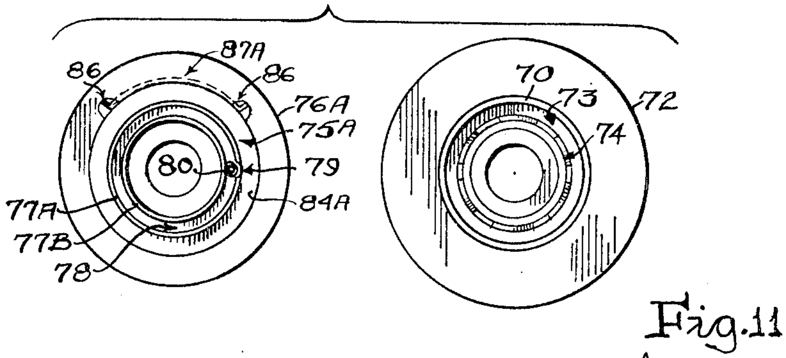
FIGURES 10 and 11 are similar views showing in plan the complementary faces of the cooperative pulley and clutch structures at each of the opposite axial ends of the pinch roller of FIGURE 9.
Figure 12:
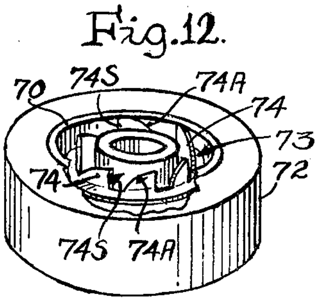
FIGURE 12 is an enlarged perspective view of the clutch structure at one end of the pinch roller of FIGURE 9.

This form of the pinch roller likewise comprises a hub portion 70 fitted with a resilient annular driving rim or tire 72 of rubber or the like, one axial end of the hub, as viewed in FIGURE 10, being provided with an annular groove 73 in which is situated an annular array of clutch teeth 74, arranged as in the perspective view of FIGURE 12, these teeth having a space on opposite sides thereof radially of the center of the roller so that they stand upwardly or axially from the floor of the groove, it being observed at this point that in this form of the device the constructions at the two opposite ends of the pinch roller are not identical but are reversed, for reasons to appear.

As seen in FIGURES 9 and 10, the hub 75A of the upper drive pulley 76A which coacts with the upper end of the pinch roller is provided with two depending, thin, concentrically-spaced annular walls 77A, 77B defining between them an annular raceway 78 into which a circular array of clutch teeth 74 is rotatably received, as in FIGURE 9, this arrangement also being seen in plan in FIGURE 10.

A shallow bore 79 (FIGURE 9) is provided in the floor of the annular raceway to receive a small clutch element in the form of a steel ball 80 aligned vertically with the locus of the clutch teeth so as to drop down in between adjacent teeth whereby to couple the pulley with the pinch roller in only one direction of rotation of the latter, the clutch teeth 74, as in FIGURE 12, having one pitched or angled camming side 74A and a straight side 74S confronting the direction of travel of the roller in which coupling will be effected thereby with the appertaining drive pulley, owing to the tendency of the ball to descend in between adjacent teeth and be caught by the straight side of the tooth 74S which trails in said direction. But in the reverse direction of rotation of the pinch roller the driving effort of the roller and hance the clutch teeth against the ball is on the pitched or angled side 74A thereof and the ball tends to ride into its bore or seat or be cammed upwardly far enough to escape the teeth and has no coupling effect with respect to its pulley.

Under the driving conditions last described, the clutch means at the opposite or lower axial end of the pinch roller becomes effective to drive its pulley 76B, the construction at this end of the roller being similar but reversed with respect to that at the upper end (FIGURE 10) in the respect that at this lower end of the pinch roller the ball seat 79 is formed in the lower roller hub part of the pinch roller (rather than in the pulley) along with another annular raceway 81, while the corresponding lower annular array of clutch teeth 82 projects upwardly (FIGURES 9 and 11) from the upper face of the appertaining pulley hub 75B.

Both pulleys 76A and 76B are provided with a thin flange 84A or 84B on the side thereof which will confront the pinch roller, whereby the pulleys will be accurately spaced for proper location of the ball with respect to the teeth, the entire assembly being captured on the fixed spindle 26 which will be normally an integral part of the cartridge.

Figure 11:
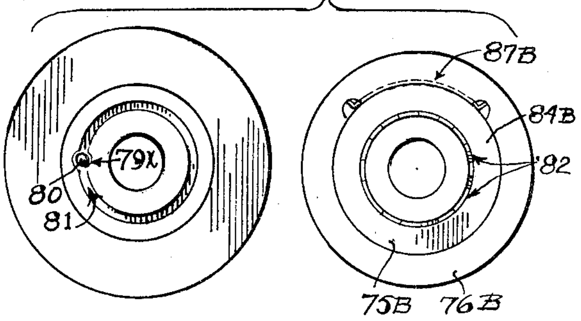

The embodiment of FIGURE 9 is also equipped with an included impositive pulley-coupling or slip clutch means, each of the drive pulleys (FIGURES 10 and 11) being provided with a pair of laterally-aligned slots 86 arranged at the opposite ends of a chord across the corresponding pulley 76A with an identical arrangement in the case of the lower pulley (FIGURE 11). Each of the drive pulleys has a blade spring 87A or 87B sprung or bowed between its pair of slots 86 with a median portion of the blade exposed in the groove of the pulley to press against the periphery of the appertaining hub element 75A or 75B, in consequence of which each pulley is coupled by its blade spring with the corresponding pulley hub, which will rotate, or not, with the pinch roller depending on the direction of rotation of the latter, but only one of the pulleys will be driven in each direction as a result of the uni-directional action of the ball-clutch means respectively situated at the opposite ends of the roller.

Figure 13:
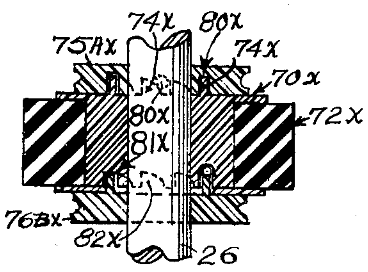
FIGURE 13 is a cross-section through a modified form of the pinch roller of FIGURE 9.

The hubs of the pinch roller and two pulleys in the construction of FIGURE 9 are preferably made of brass; but a further modification of this embodiment, which is especially suited to fabrication from synthetic plastic molding materials, is illustrated in FIGURE 13 wherein the pinch roller tire 72X is the usual rubber or composition annulus fitted onto a one-piece molded plastic hub 70X having one set of salient clutch teeth 74X integrally formed therewith to project upwardly from the face of the upper axial end thereof, instead of being recessed in a well as in the construction of FIGURE 9, the opposite axial face of this pinch roller hub having formed therein an annular race 81X to receive the salient teeth 82X which are molded as a part of the corresponding lower drive pulley 76BX, while the upper pulley 75AX has a race 80X formed therein to receive the teeth 74X, each race being equipped with the same type of ball seat and coupling ball 79X as described for the metal counterpart of FIGURE 9.

Optionally, the upper and lower drive pulleys 75AX and 76BX may also include the slip-coupling means 87A, 87B depicted in FIGURES 10 and 12, in which case these pulleys will be formed in two parts, as in FIGURE 9, both of molded plastic.

The molded embodiment, as constructed in FIGURE 13, is particularly adapted for use in cartridges employing slip-coupled tape reels, such as disclosed in the aforesaid U.S. Patent No. 3,348,786 and therefore the drive pulleys 75AX, 76BX omit the spring blade coupling means 87A, 87B.

It is desirable for some types of transducing equipment to effect the reversal of tape travel by flipping the cartridge over in its seat at the driving capstan, instead of reversing the capstan motor, such cartridges being sometimes called "flip-flop" cartridges. The construction of FIGURES 14 to 17 discloses a compound pinch roller unit which embodies reverse-drive and flip-flop clutching means together with a set of drive pulleys having slippage coupling with the pinch roller, and affords a "universal" cartridge which can be used in either a reversing capstan or a flip-flop playback or transducing machine.

Figure 14:
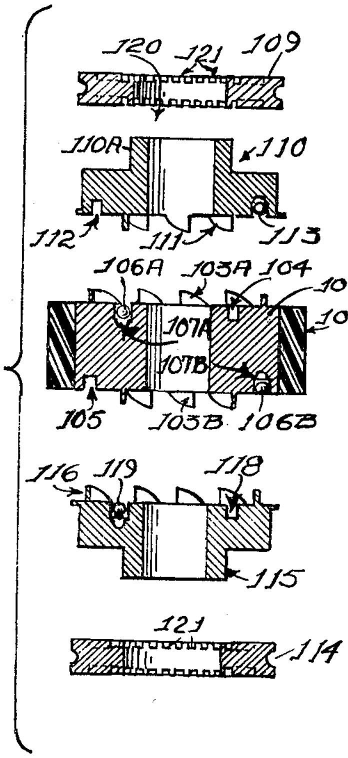
FIGURE 14 is an exploded view in cross-section of a modified form of pinch roller adapted to both capstan-reversal and flip-flop operation.

Referring to FIGURE 14, the pinch roller proper comprises a hub 100 fitted with the usual pressure tire or rim 101 and having at both axial ends thereof an annular array or set of reversely-oriented clutch teeth 103A or 103B similar to those previously described.

Figure 15:
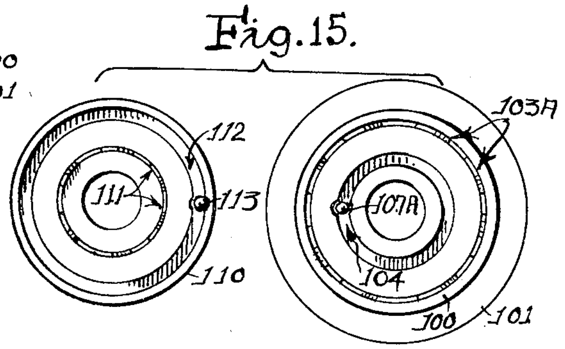
FIGURES 15 and 16 are plan views respectively of the complementary faces of each of two sets of clutch elements provided at the opposite ends of the pinch roller assembly of FIGURE 14.

At the upper side of the hub 100 is a race 104 which is located inwardly of the array of teeth 103A, while the lower side of the hub is provided with a race 105 which is circumambient of the adjacent tooth array 103B, and both races respectively include a coupling ball 106A or 106B in an appertaining seat or bore 107A or 107B, this arrangement being further evident in FIGURE 15.

Disposed at each axial end of the roller hub is a pulley hub, the upper hub 110 having in its roller-confronting or juxtaposed face a circular array of clutch teeth 111, an annular race 112, and a coupling ball 113 therein, it being observed that this pulley race is disposed outwardly of the teeth and in this respect is arranged oppositely from the corresponding parts in the juxtaposed face of the pinch roller therebelow, with the result that the pulley ball 113 is disposed to coact with the outside roller hub teeth 103A, while the pulley teeth 111 coact with the inside ball 106A on the roller hub, depending upon the flip-flop orientation of the carriage, and therefore of the pinch roller, and which of the two coupling balls is accordingly in position to gravitate into coupling engagement with its corresponding array of clutch teeth, or to lock behind the teeth in the case of reversal of the capstan rotation without turning the cartridge over.

Figure 16:
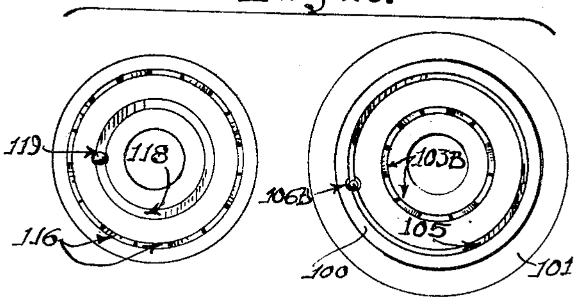

The hub 115 of the drive pulley at the lower side of the pinch roller likewise has an annular array of clutch teeth 116 adapted to enter the pinch roller race 105 for cooperation with the ball 106B; and is provided with a race 118 and coupling ball 119 seated therein for cooperation with the roller teeth 103B, it being observed in FIGURE 16 that the array of lower-pulley teeth 116 circumscribes the corresponding race 118, while the array of pinch-roller teeth 103B is situated within the ambit of the corresponding race 105, it being further observed that this arrangement is likewise a reversal of that of the upper paired roller and pulley hubs, one of the two coupling balls for the lower pulley, as depicted, being likewise responsive in coupling action to the flip-flop position of the cartridge, while its companion ball responds to the direction of rotation of the pinch roller, as in the case of the clutching actions in the upper pulley combination.

Figure 17:
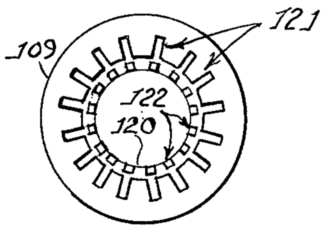
FIGURE 17 is an end view of one of the drive pulleys seen in FIGURE 9.

Each pulley hub 110 or 115 is provided with a pulley sheave 109 or 114, formed preferably of a plastic material such as Nylon, and having special slip-coupling formations arranged as depicted in FIGURE 17, wherein radial reliefs or slots 121 with intermediate dimpling 122 bordering into a slightly undersized spindle bore 120 provide a frictional slip seizure between the sheave and the collar 110A of the corresponding pulley hub, the two hubs 110 and 115 and their respective sheaves being of identical construction and operation in these latter respects.

The operation of the form of pinch roller described in view of FIGURES 14 to 17 is such that when installed upon the common spindle 26 in the cartridge in the manner depicted in FIGURE 1, with corresponding upper and lower pulley-belt connections between the drive pulley sheaves and the corresponding reel pulleys, the cartridge may be inserted in its seat on the sound deck to press the pinch roller 100 against the capstan 29, as in the manner of FIGURE 2, and the positive reel-driving action will be reversed in response to a reversal of the direction of rotation of the capstan motor and spindle, this being achieved by that one of the coupling balls in either pair which is disposed to engage the flat side of the teeth in the direction of the rotation, or, reversal of tape travel may also be effected by simply "flipping" or turning the cartridge over in its seat with respect to the capstan, in which case the coupling ball which is gravitationally responsive and drops behind the flat sides of the clutch teeth will effect the coupling.

In either type of clutching, that is to say by reversal or flip-flop, the pulley-coupling formations 118–119 on the sheaves of the drive pulleys on that one of the latter which is running free in pay-out travel of the tape will afford sufficient slippage and frictional reaction with the common pinch roller spindle 26 to apply the needed braking effect on the free-running tape reel, as in the case of the previously-described embodiments.

Thus, it will be observed in FIGURE 14 that the two sets of upper and lower clutch teeth 103A, and 111 each cooperate with one of a pair of clutch balls and have teeth which are mutually reversed with respect to their pitched cam sides and straight ball-catching or clutching sides, as previously explained in view of FIGURES 10, 11, 12 (e.g. at 74A, 74S). Moreover, the same reversed clutching relationships exist in the two sets of teeth at the lower half of this pinch roller assembly, in consequence of which it will be apparent from inspection of FIGURE 14 that if the pinch roller is assumed to turn clockwise, the teeth 103A, having their curved edges leading, will cam the appertaining ball 113 out of the way in idling action, while the companion ball 106A will be dropped into its well and likewise run idle. But at the lower end of the pinch roller the ball 106B will drop behind the straight clutching side of the teeth and lock to turn the corresponding pulley, the companion ball 119 idling over the pitched or curved sides of the teeth 103B at this time.

Should the capstan be reversed under these same conditions, the upper set of balls 106A, 113 would run idle while the lower ball 106B would not clutch or lock behind teeth 116 with the companion ball 119 idling relative to teeth 103B.

The upper set of balls 106A, 113, would run idle, as would the one lower ball 106B, while the companion lower ball 119 would clutch or lock behind a tooth in set 103B.

Flipping the cartridge over, on the other hand, will result in similar alternate clutching actions of the two balls which then become the lower pair.

Thus, the clutching in a given direction of rotation of the pinch roller is determined by the lowermost pair of balls, each of which is effective in one particular directon, which the balls in the upper set idle in both directions.

I claim:

1. In sound tape apparatus of the capstan-drive type, a composite pinch roller and reel-driving pulley assembly adapted to be driven by a reversibly rotatable capstan spindle and comprising, namely: a pinch roller having a hub portion at each of its axial ends; a reel-driving pulley structure at each of said axial ends of the pinch roller, each pulley structure including a pulley hub and a sheave rotatable thereabout; means mounting the respective pulley structures in cooperative assembly with the pinch roller in the positions aforesaid with the respective pulley hubs each juxtaposed in close proximity to a corresponding one of the pinch roller hub portions and the corresponding sheaves each respectively rotatable about the appertaining pulley hubs; slip-coupling means yieldingly coupling each sheave with the appertaining pulley hub for impositive drive by the latter; and unidirectional clutch means for each pulley structure operative in each instance to couple the corresponding pulley hubs with the corresponding juxtaposed pinch roller hub portions for positive driving rotation with the pinch roller only in a particular one of the opposite directions of rotation of the latter, the said particular directions of rotation being opposite for each pulley hub, whereby a different one of the pulley structures is positively driven dependently upon the direction of rotation of the pinch roller.

2. Apparatus according to claim 1 wherein the unidirectional clutch means, for each pulley structure, comprises in each instance an annular collar on each pinch roller hub portion coaxially confronting the appertaining pulley hub; a helical spring having a portion, at least, of its helix closely embracing said collar and a free end portion remote from said collar drivingly engaged with said appertaining pulley hub, the spring helix reacting on turning of the pinch roller in the appropriate one of the particular directions of rotation aforesaid, to seize the appertaining collar and positively couple the corresponding pulley hub with the pinch roller for joint driving rotation in such particular direction.

3. Apparatus according to claim 1 wherein the slip-coupling means comprises a spring member carried within each sheave and bearing frictionally against a part of the appertaining pulley hub to yieldingly seize and turn with the latter.

4. Apparatus according to claim 3 wherein the spring member is a blade spring carried within the sheave and extending in the sense of a chord across a bore receiving the hub of the appertaining pulley hub and frictionally engaging with said hub.

5. Apparatus according to claim 3 wherein the spring member is a circularly curved spring element carried between the pulley hub and appertaining sheave within the latter and having a portion drivingly engaged with the sheave and other curved portions frictionally engaging and yieldingly seizing portions of the pulley hub to drive the latter impositively.

6. Apparatus according to claim 1 wherein said slip-coupling means comprises the provision in each sheave of a bore fitting frictionally upon a coaxial collar part of the appertaining pulley hub with force to yieldingly seize the collar to turn with the sheave and to yield against turning when more than a predetermined force resists such turning.

7. The construction defined in claim 6 wherein each sheave is formed of a plastic material and has radially extensive deformations in an axial end face, at least, of the sheave and bordering the margin of said bore, and so to permit slight expansion in press fit with the coaxial collar part aforesaid.

8. Apparatus according to claim 1 wherein the unidirectional clutch means comprises for each pulley structure the corresponding pulley hub as a first clutch member and the appertaining pinch roller hub portion as a second clutch member, one of said clutch members having affixed thereon a circular array of clutch teeth concentric with the axis of rotation of the pulley structure, together with a third clutch member movably seated in the other of said clutch members in alignment with said array of clutch teeth for engagement with any of said teeth to couple said first and second clutch members for positive joint rotation in the corresponding one of said particular directions of rotation aforesaid.

9. The combination of claim 8 wherein said slip-coupling means is a spring means disposed in fixed position interiorly of the sheave and acting frictionally against the pulley hub in yielding coupling action as aforesaid.

10. Apparatus according to claim 1 wherein said unidirectional clutch means is both directionally and positionally responsive for each pulley structure and comprises, in each instance, the pinch roller hub portion and appertaining pulley hub as a first pair of hub components at one axial end of the pinch roller, and the pinch roller hub portion and appertaining pulley hub at the opposite end of the pinch roller constitutes a second pair of hub components, there being a circular array of unidirectional clutch teeth on each hub component of each said pair, the two arrays of each said pair comprising a set, the teeth of one array in each set projecting axially toward the teeth in the other array in such set and the diameter of one array being less than that of the other array in each set and one array is disposed concentrically within the other in each set and both said arrays are concentric with the pinch roller axis; each said set being provided with two clutching elements constituting a pair, one of which elements is directionally responsive and the other of which is positionally responsive, said elements in each set each being movably seated in a different one of the hub components of the appertaining set for clutching coaction with a corresponding array of teeth in the opposite hub component of such set, the teeth in both arrays of a set being formed for coupling coaction in the same direction of rotation of the pinch roller with the appertaining clutching elements and the direction of rotation of the pinch roller necessary to produce such coupling coaction in one set being the reverse of the direction which will produce such coupling coaction in the other set; the direction of rotation of the pinch roller which will produce said coupling coaction by the directionally-responsive clutching means being the same as that produced by the positionally-responsive clutching element when the assembly is in a first position of vertical alignment of the rotational axis thereof, and the two clutching elements at the opposite end of the assembly both effecting coupling coaction in the reverse direction of pinch roller rotation when the assembly is flipped 180° into the opposite vertical orientation, whereby one or the other of the pulley structures can be positively driven each in a direction opposite to the direction of the other by driving the pinch roller in one or the other direction, or the pulleys may be similarly driven by flipping the assembly over as aforesaid.

11. Sound tape apparatus according to claim 1 further including a pair of tape reels, and a cartridge case containing the same and within which said composite pinch roller and pulley assembly is housed; said cartridge case having an opening through which the pinch roller is peripherally exposed for driving engagement with a capstan spindle situated externally of the case; a capstan spindle and a reversible motor driving the same; sound tape being traveled from one said reel to the other and reversely along one side of the case and over the periphery of the pinch roller to be drivingly caught between the latter and the capstan spindle, said side of the case having a switch opening at each of two positions spaced from the pinch roller on opposite sides thereof and the case having a post member disposed at each said switch opening over which the travelled tape turns in moving to and from the pinch roller, said tape having opposite end regions each respectively attached to one of the reels together with stop means affixed to the tape adjacent each said end region on the outer face of the tape which will be proximate to the capstan spindle in travel as aforesaid; stop means near each end of the tape and comprising a tab having a leg attached at one end portion to the outer face of the tape to lie normally against said face and having a stiffness sufficient to cause the tab to move into a substantially angular position outwardly-projecting from said face as the tape turns around the corresponding post member at the appertaining switch opening; a motor reversing switch disposed opposite each switch opening on opposite sides of the capstan spindle, each switch having an actuating part projecting into the corresponding opening in a position to be engaged by the appertaining tab in projected position as aforesaid, said actuating part being moved by the tab to operate the switch and reverse said motor; said tab being windable normally back against and with the tape onto the appertaining reel.

12. Apparatus according to claim 11 wherein each said tab leg has an integral cross bar defining with the leg a T-configuration and said switch actuating part includes a forked configuration into which said leg moves and said cross bar catches with said part to move the same as the tape turns on the post as aforesaid.

13. In sound tape apparatus and the like, a reverse driving pinch roller and pulley assembly for driving cooperation with a reversely rotated capstan spindle to travel sound tape back and forth between a pair of tape reels, said assembly comprising a pinch roller having a hub with opposite ends, a reel-driving pulley structure at each of said hub ends, each said structure having a pulley hub in close juxtaposition with the appertaining one of said hub ends; spindle means mounting said pinch roller and pulley structures in cooperative assembly as aforesaid for rotation of the pinch roller in opposite directions and driving of a different one of said pulley structures in each of the opposite directions of rotation of the pinch roller; mutually oppositely driving unidirectional clutch means concealed within the juxtaposed portions of each pinch roller hub end and the appertaining pulley hub and operative in one particular direction of rotation of the pinch roller to couple the corresponding pulley hub with the pinch roller, the operation of said clutch means being such that the direction of rotation of the pinch roller necessary to effect said coupling action for one pulley structure is opposite to that required to effect such coupling action for the other pulley structure; a reel-driving sheave rotatably carried by each pulley hub and coupling means wholly contained within the confines of each pulley structure yieldingly coupling the corresponding sheave with the appertaining pulley hub for rotation with the latter in both directions, said coupling means being of a character such that each sheave can slip relative to its pulley hub when the resistance on the sheaves exceeds by a predetermined amount the torque exerted thereon by the appertaining pulley hub.

14. In a capstan drive type of sound tape cartridge, the combination, with a pair of tape reels and a pinch roller over which the tape passes in moving from one reel to the other, said roller and the tape thereon being exposed to driving contact with an external capstan spindle for driving the pinch roller and travelling the tape; a composite pinch roller and pulley means comprising a pulley structure at each axial end of said pinch roller and coaxially rotatable with the latter when drivingly coupled thereto; and dual unidirectional clutch means drivingly interposed between each pulley and the pinch roller, each said dual clutch means comprising a directionally-responsive clutch having an oppositely directed coupling action from the directionally responsive clutch means at the opposite end of the pinch roller; each dual clutch means also including a gravity-sensitive clutch means having a unidirectional coupling action which is directionally opposite that of the gravity-sensitive clutch means at the opposite end of the pinch roller; each gravity sensitive clutch means being rendered effective when the cartridge is in either of two positions 180° apart, each said position also corresponding to one of the positions in which one of said directionally-sensitive clutch means is effective for driving action; and means drivingly interconnecting each pulley with one of said reels.

References Cited

UNITED STATES PATENTS

| | | | |
|---|---|---|---|
| 3,257,515 | 6/1966 | Nakamatsu | 242—55.12 X |
| 3,348,786 | 10/1967 | Miller et al. | 242—55.13 |

GEORGE F. MAUTZ, Primary Examiner

U.S. Cl. X.R.

226—181, 188